(No Model.) 4 Sheets—Sheet 1.
S. W. MARTIN.
WIND ENGINE.
No. 500,340. Patented June 27, 1893.
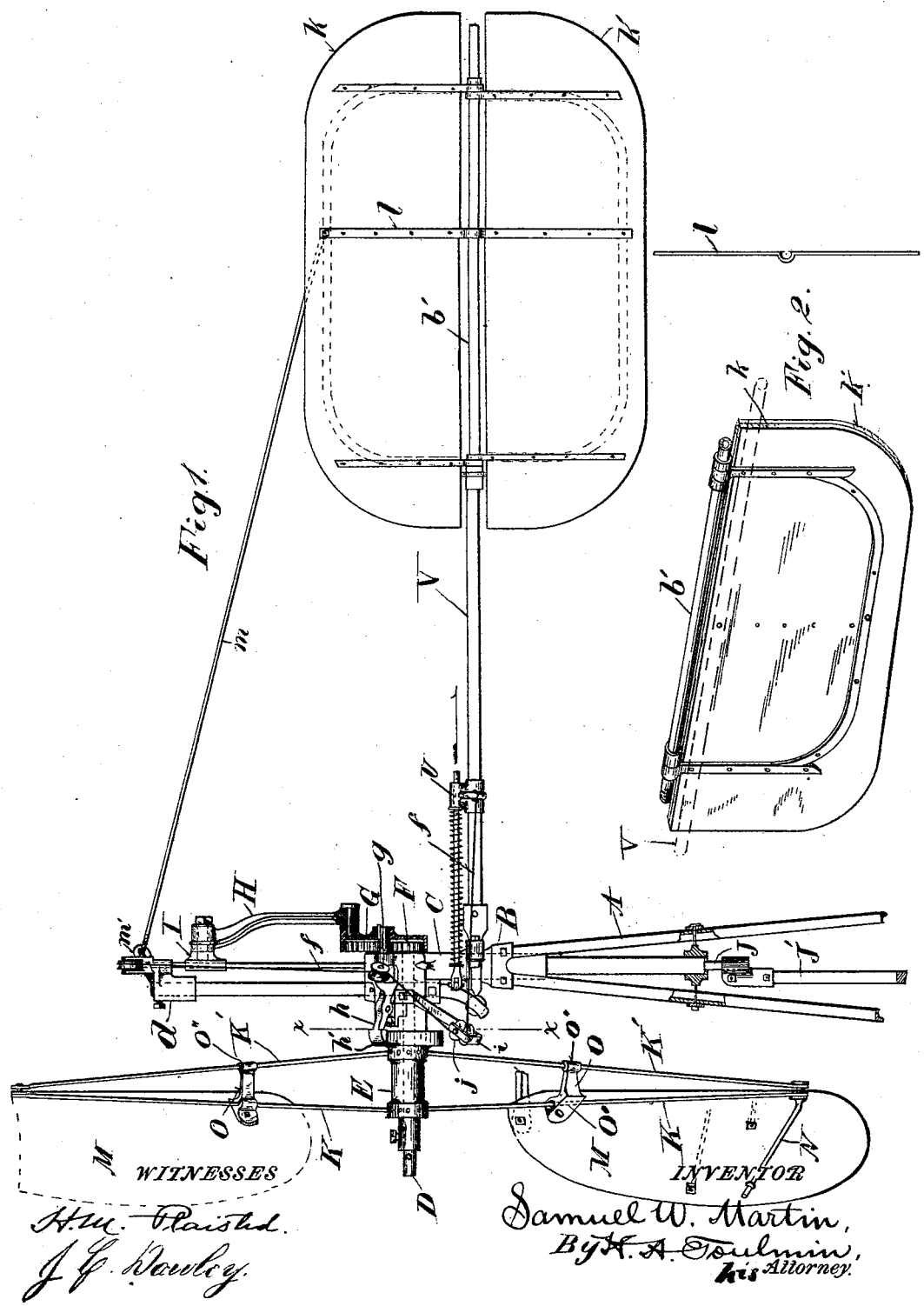

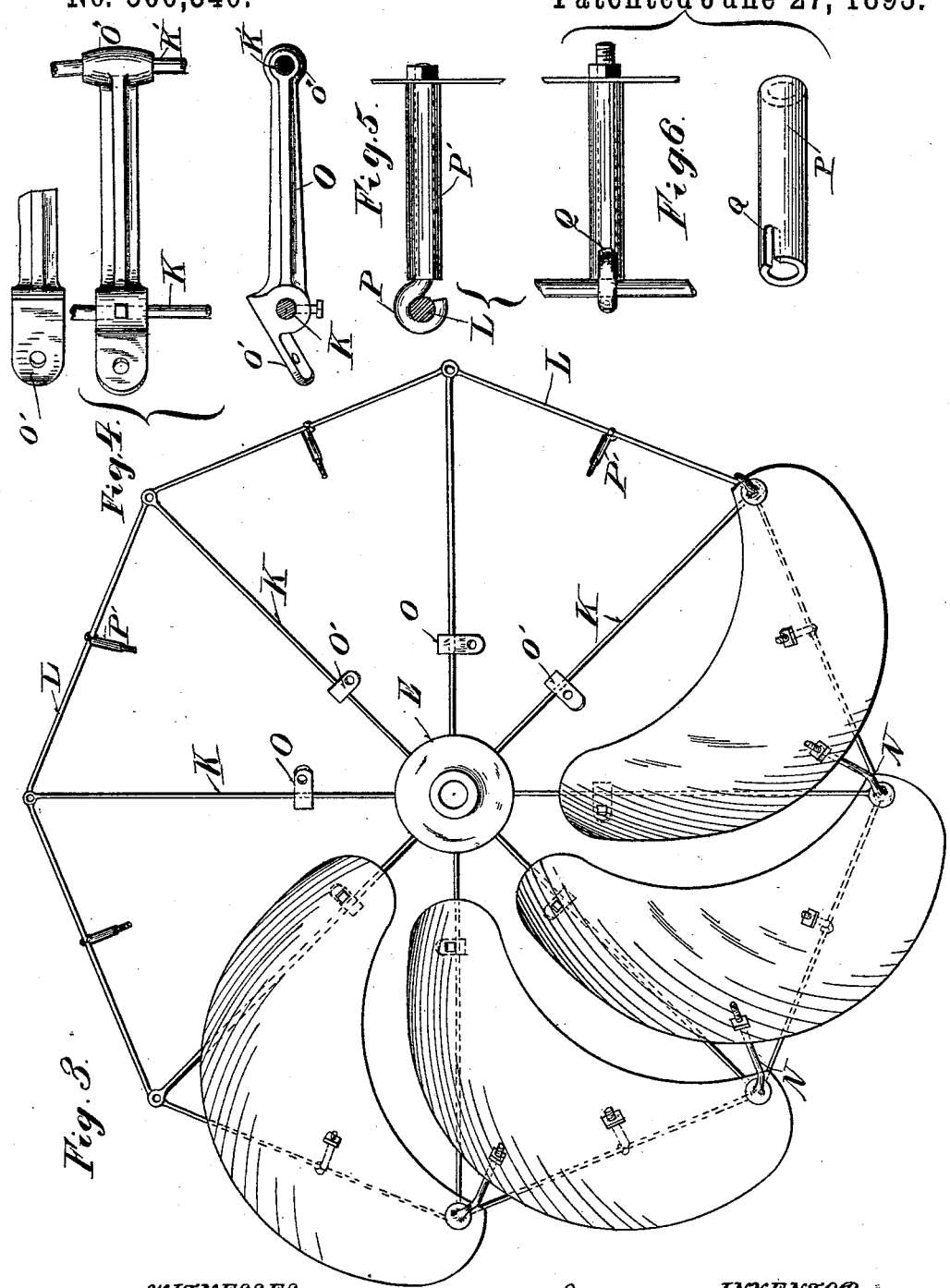

(No Model.) 4 Sheets—Sheet 3.

S. W. MARTIN.
WIND ENGINE.

No. 500,340. Patented June 27, 1893.

WITNESSES
H. M. Plaisted
J. C. Dawley

INVENTOR
Samuel W. Martin,
By J. A. Toulmin,
His Attorney.

THE NORRIS PETERS CO., PHOTO-LITHO., WASHINGTON, D. C.

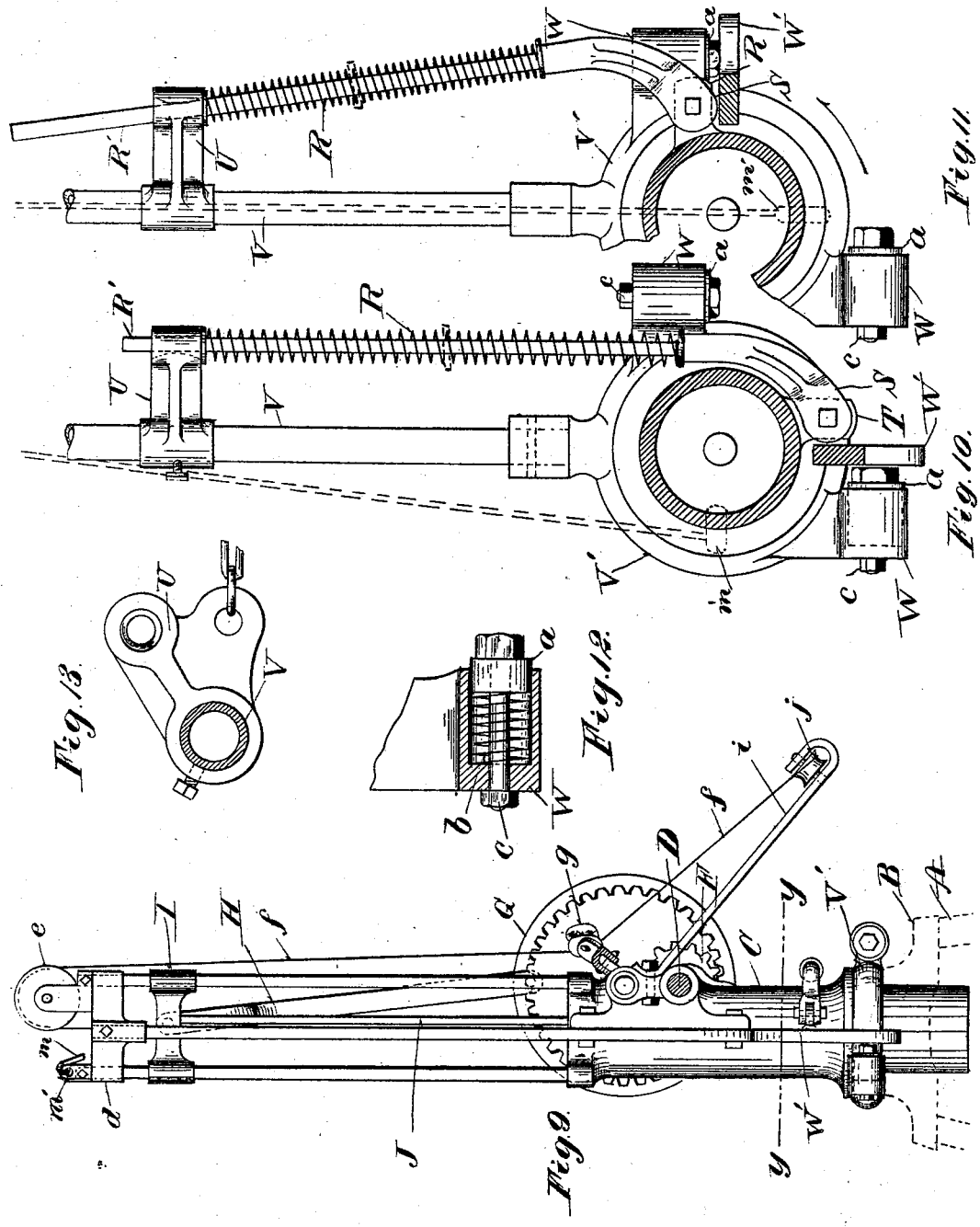

UNITED STATES PATENT OFFICE.

SAMUEL W. MARTIN, OF SPRINGFIELD, OHIO, ASSIGNOR TO THE MAST, FOOS & COMPANY, OF SAME PLACE.

WIND-ENGINE.

SPECIFICATION forming part of Letters Patent No. 500,340, dated June 27, 1893.

Application filed February 24, 1892. Serial No. 422,645. (No model.)

*To all whom it may concern:*

Be it known that I, SAMUEL W. MARTIN, a citizen of the United States, residing at Springfield, in the county of Clark and State of Ohio, have invented certain new and useful Improvements in Wind-Engines, of which the following is a specification, reference being had therein to the accompanying drawings.

My invention relates to certain new and useful improvements in wind mills, being especially adapted for pumping water or furnishing motive power for other purposes.

The object of my improvements is to provide a wind engine of light yet strong construction, adapted to withstand the pressure of the wind in operating, to turn out of the wind when the pressure reaches a predetermined point, and return automatically on the pressure falling below said point, and to provide various constructions and combinations of parts adapted to facilitate transportation and mounting.

To this end my improvements have reference to a wind wheel of skeleton construction, and to various parts adapted to support the blades thereon; to a special form of these supporting parts, consisting of braces which shape the blades to the proper form when secured thereto; have reference to the blades themselves, adapted to be shipped in their flat, spread out condition, and requiring no special manipulation in order to adapt them to their position on the skeleton frame; have reference to a coil spring acting to present the wind wheel normally to the wind, and to a special form of support for the tail vane, whereby the weight of the vane will assist in returning the wind wheel to this normal position, as the said spring diminishes its action; have reference to a tail vane adapted to be folded and shortened for transportation; have reference to special forms of braces, and other points of construction hereinafter described and particularly pointed out in the claims.

Figure 7:
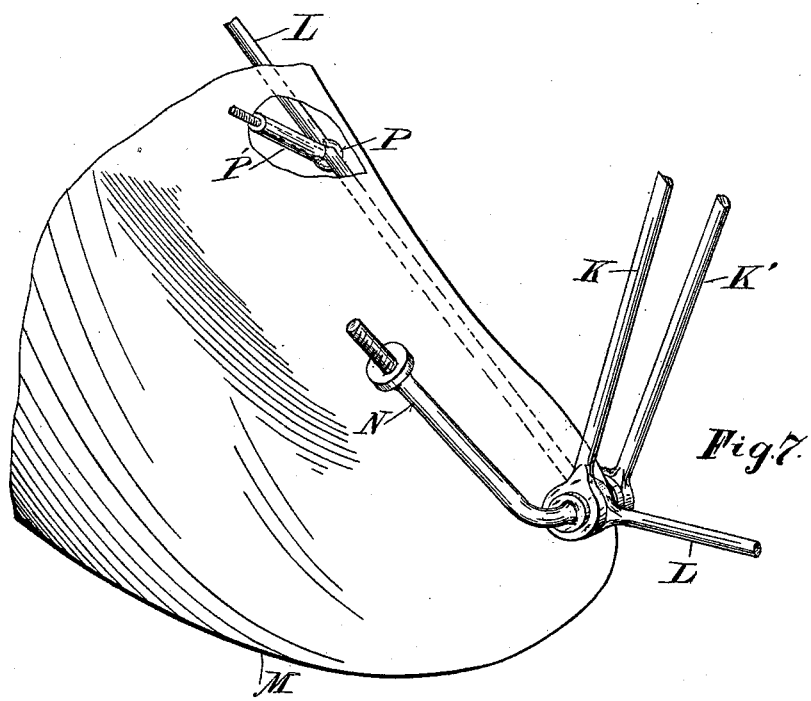
Figure 8:
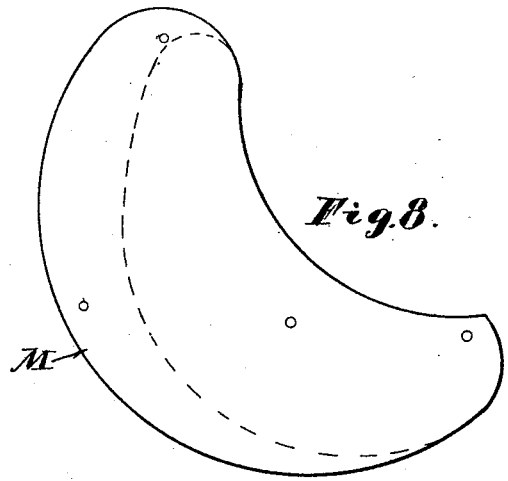

In the accompanying drawings on which like reference letters indicate corresponding parts, Figure 1, represents a side view of my wind engine, portions being shown in section, and parts removed to make clear the construction; Fig. 2, a perspective view of the tail vane, folded and detached for shipment; Fig. 3, a front view of the wind wheel, showing the skeleton frame and supporting braces for the blades, a number of the latter being mounted thereon; Fig. 4, detached views of the angle brace adapted to give the proper shape to the inner ends of the blades; Fig. 5, a detail view of a hook brace partially secured to a cross stay and adjacent blade; Fig. 6, a similar view showing the same firmly securing the blade to the cross stay and acting as a hook as well as brace; Fig. 7, a perspective view of a portion of a blade, the outer and inner spokes, and cross stays, secured to the lower ends thereof by a forward stay bolt; Fig. 8, a detached view, smaller size, of a blade in its flat position, the curved shape it assumes when mounted being shown by dotted lines; Fig. 9, a view taken on the line $xx$ of Fig. 1, looking to the right; Fig. 10, a cross section of Fig. 9 on the line $yy$, and enlarged; Fig. 11, a similar view to Fig. 10, showing the return spring under compression when the windwheel is turned out of the wind in the direction of the arrow; Fig. 12, a sectional view of a spring buffer; and Fig. 13, a face view of a tail vane bracket.

Heretofore in the construction of wind engines the weight of the wind-wheel and other operative parts mounted on the turn-table, has been a serious objection in their operation and transportation, increasing as it does the wear of the parts, the difficulty of handling and the cost of manufacturing. In my engine, however, I provide a minimum weight of the parts for the size required to give the requisite power, and by various devices and peculiarities of construction hereinafter described, I facilitate the operation of the engine, increase the efficiency thereof, and lessen the difficulties of shipment.

Referring to the drawings, the letter A designates a tower of angle iron, or other suitable construction, provided with a cap B serving for a stationary portion of the turn-table, on which is rotatably mounted the head C, having bearings in which are supported the wheel shaft D carrying the wind-wheel hub E, and also the driving pinion F, meshing with the crank-wheel G connected by a rod H, with a cross-head I, operating the crank rod J, to which is ordinarily secured the wooden pump-rod J', Fig. 1.

Referring to the wind-wheel, the construction is as follows: The hub E is provided with radiating spokes K K' separated axially at their inner ends, and connected at their outer ends as shown in Figs. 1 and 7. The front spokes K preferably slant slightly to the rear, but are braced by the rear spokes K' and connected by cross-stays L, so as to form a rigid skeleton frame of strong yet light construction, and somewhat after the style of an umbrella frame. Upon this frame are mounted the blades M, consisting of sheet metal cut in their flat, sheet form, and bent to the proper shape by attaching them to suitable brackets and stays mounted on said skeleton frame. The flat position of the blade is shown in Fig. 8, and being of sheet metal, the blades may be packed together in considerable number, within small compass for shipment. The outer end of each blade is mounted at the junction of the spokes and stay-rods, and also firmly bolted together by means of a forward stay bolt N, which secures the four pieces together with the blade, at one end, and at the outer end it supports the outer edge or main part of the blade. The inner end of each blade is bolted to an angle brace or bracket O, the angle face O' of which has the proper inclination to shape the inner end of the blade, when firmly bolted thereto, as shown in Fig. 3. The center of each blade, or approximately the center thereof, is drawn in and maintained in the proper position, by means of a hook-brace, consisting of a hook P and a sleeve P', having a notch Q, Fig. 6, in which the hook portion slips, when the parts are bolted together, thereby bringing the cross stay L firmly down upon the sleeve P', to prevent the blade turning against the pressure of the wind, as well as tying it to the cross stay to give, and maintain it in, the proper shape. The angle brace O is preferably provided with a rear extension O'', through which passes the rear spoke K', thus connecting the spokes together and transferring the pressure of the wind upon the blades to both the spokes. The whole framework of the wheel is thus firmly bound together, tied and braced to constitute a rigid wheel, of light construction, easily shipped in its component parts, and readily put together on reaching its destination.

Referring to Fig. 9 it will be seen that the shaft of the wind wheel is located at one side of the center of the turn-table and rotatable hood. The pressure of the wind will therefore tend to throw the wheel out of the wind, and this tendency is resisted in my device, by means of a coil spring R mounted on a spring rod R', the head S of which is pivoted to a lug or projection T from the turn-table head, as seen in Figs. 9 and 11. The other end of the spring rod reciprocates in a bracket U mounted on the tail vane stem V, whereby the rotation of the head in the direction of the arrow, Fig. 11, under the pressure of the wind, will compress the spring R against the bracket U, as the wheel turns out of the wind. The lessening of the pressure of the wind will allow the spring to return the wheel to its normal position. In order to check this return without damage to the machine, a spring buffer is provided, consisting of a shell W, within which is mounted a sliding piece, a, pressed outward by a spring b, contained within said shell, and limited in its action by the set bolt c, Fig. 12. A similar spring-buffer is provided at the side of the head, to check the wind-wheel when suddenly thrown out of position by the wind, as in Fig. 11. The stop piece W' Figs. 9, 10 and 11, is carried by the head, and engages with said spring-buffer when operated as just described. This stop piece preferably supports also the cap d, to which are secured the guides for the cross-head, and a bracket which carries a pulley for the operating cord f, which passes over said pulley and under a pulley g, carried by a friction or brace lever h which engages with a friction disk h', Fig. 1. An arm i, supports another guiding pulley j for the cord f, in order to give it sufficient leverage upon the rotatable head, when the strain is exerted on the tail-vane-bracket U, and to which the cord or chain f is preferably secured, as shown in Fig. 1. The end of this cord is carried down the tower to allow of turning the wheel out of the wind by hand and maintaining it in said position.

The stem or back-bone of the tail vane is mounted in a ring or collar V' encircling the head of the turn table, as shown in Figs. 9 to 11, so as to easily rotate thereon under the action of the wind upon the wind-wheel and a return spring R. The blade or tail of the vane consists of two parts k k' hinged to the back-bone extension b', as shown in Fig. 1, and braced in its open position by a cross piece l firmly secured on both sides thereof. The extension of the back-bone is coupled to the stem V by screw threaded or other engagement, so as to be readily removed therefrom. The hinged connection of the vane and said extension allows of folding it as in Fig. 2, and thus it is made to occupy but little space in shipment on account of its uncoupled and folded condition as shown in Fig. 2. The supporting stay-rod m is connected at one end to the vane and at the other end to an eye lug m' on the cap d, the point of attachment being on the other side of the head from the return spring R. The weight of the blade when the wheel is opposed to the wind will tend to preserve it in said normal position and thus assist the return spring R when the latter is under least tension. This position is indicated by dashed lines in Fig. 10. When the wind-wheel rotates in the direction of the arrow, Fig. 11, it brings the lug m' in line with the axis of the tail vane, as shown by dashed lines in Fig. 11, thus exerting no influence on the head when the return spring is under greatest compression—that is, when the spring R exerts its greatest influence on the head, the weight of the blade is not exerted to rotate the head, but when the spring is weakest in its action the weight of the blade assists the spring by the longer leverage it secures through the eccentric mounting *m'* with regard to the axis of the head.

It will be observed that in case of breakage of the srping R a washer may be slipped between the broken parts as indicated by dotted lines, and each part act against the other part of the spring. This style of spring is therefore especially adapted for my purpose, possessing advantages of repair over torsional or tension springs, which will be appreciated by the users.

Having thus fully described my invention, what I claim as new, and desire to secure by Letters Patent, is—

1. In a wind engine, the combination with a hub, of spokes mounted in said hub, their inner ends being separated axially and their outer ends approaching each other, the rear spokes thus bracing the front spokes, independent cross stays or rods connecting each pair peripherally, angle brackets having an inclined face and each carried by, and connecting as a brace, each pair of the said spokes, blades secured to said angle brackets and normally flat, but shaped to curve when mounted according to the inclination of said bracket faces, and adjunctive devices connected to said blades and frame to maintain the blades in their curved position.

2. In a wind engine, the combination with a wheel hub, of a series of front and rear spokes mounted on said hub, with their inner ends separated axially, and their outer ends approaching each other, straight cross stays or rods directly connecting said spokes at their outer ends from pair to pair, a stud bolt passing through and securing said spokes and stays at one common fastening point on one end of the bolt, the bolt extending forward substantially as shown, to support a portion of a blade or wing on the other end of the bolt, and blades or wings mounted on said frame and stud-bolts, substantially as shown and described.

3. In a wind engine, the combination with a skeleton wheel frame, of brackets each embracing a front and a rear spoke and having an inclined face at one end substantially as shown, the said incline of the bracket giving the shape to the blade or wing bolted thereto at the inner end, flexible blades normally flat when detached, but shaped for proper form when mounted on said angle brackets, and supporting stays to maintain said blades in their bent-up operative position on said wheel.

4. In a wind engine, the combination with a skeleton frame, a wind wheel consisting of pairs of front and rear spokes respectively, inclined toward each other, and a stay-brace between adjacent pairs at their outer ends, the said stays and spokes having eyes or hooks at their outer ends, of flexible blades perforated at their outer ends, a supporting stud-bolt, one end passing through and connecting, at one common point, a pair of spokes, the stay braces therefor and the outer end of a corresponding blade,—and the other end extending forward and engaging with a succeeding blade substantially as shown, and means to secure the remaining portions of said blade in suitable operative positions.

5. In a wind engine, the combination with a wheel-hub and a skeleton frame supported thereby, consisting of a double series of spokes radiating from said hub and connected at their outer ends, cross stays for said spokes, angle brackets having inclined faces for the blades, and each mounted on one pair of said double series of spokes, flexible blades secured to said inclined faces of the brackets, stud-bolts connecting said outer ends of the spokes by one end, and staying a portion of the respective blades at the other end, and a tie brace secured to each blade at an intermediate point, and to its respective crossstay, whereby each blade is stayed outward by its bracket and stud-bolt, and bent inward by its intermediate tie-brace.

6. In a wind engine, the combination with a wind wheel and blades or wings carried thereby, of a hook-brace consisting of a threaded hook-bolt adapted to embrace a portion of the frame at one end and be bolted to a blade at the other end, and having an inclosing sleeve provided with a notch for said hook-end, whereby the hook brace will act both as a tie and a brace for said blade, and the sleeve be prevented from turning by said notched engagement.

7. In a wind engine, the combination with a turn-table, a rotatable head, and a wind wheel mounted thereon, of a folding tail-vane connected to said head and means to maintain it in its open position, whereby said vane may be folded for transportation.

8. In a wind engine, the combination with a turn-table a rotatable head therefor, and a wind wheel mounted on said head, of a folding tail-vane connected to said head and consisting of members hinged together whereby it may be folded, and a detachable extension of the stem of said vane, whereby the vane may be uncoupled and folded for transportation, and means to secure it in its coupled and unfolded position.

9. In a wind engine, the combination with a wind wheel frame and brackets on said frame adapted to support and shape wings or blades detachably secured thereto by bolts and nuts, of flexible wings or blades mounted on said brackets and bent to suitable shape by being so mounted, and normally flat in their unmounted condition, whereby said blades may be shipped in their flat, spread-out form, and be readily bent to shape in the act of mounting.

10. In a wind engine, a wind wheel consisting of pairs of front and rear radiating spokes approaching each other, cross stays at their outer ends, sheet metal wings or blades substantially of the shape shown, a stud bolt securing the outer end of the blade to the meeting ends of the pair of spokes and their stay-rods, and extending forward as a brace for the middle of the succeeding blade, a hook-bolt carried by each of said cross-stays and engaging with its blade between two adjacent stud bolts, to draw the blade inward, and an angle bracket having an inclined face and carried by each pair of spokes near the center of the wheel, to bend the inner end of its blade to suitable shape and hold it outward, substantially as shown and described.

11. In a wind engine, the combination with a turn-table and a head mounted thereon, a wind wheel carried by said head, and a tail-vane rotatively connected to the turn-table on the same axis, of a coiled spring interposed between said tail-vane and said head, and adapted to be compressed when the head and the wind wheel are rotated under the wind pressure, and then to return said head and wheel to their normal position, and a connection running upward from said tail-vane to a point above and on the other side of the vertical axis of the head and the tail-vane from the side to which the vane turns, whereby the rear end of the vane is raised when the wheel turns out of the wind, and the weight of the vane returning will pull on the said connection, and assist the spring in returning the head and the wheel to their normal positions.

12. In a wind engine, the combination with a turn-table and a rotatable head mounted thereon, of a tail-vane rotatably connected to said head and extending directly rearward, the vertical axes of the head and vane lying in substantially the same vertical plane, a connection from the rear of the tail-vane to a fastening point on the head at one side of the vertical axis of the vane, and a spring acting at the other side of the vertical axis and against the tail vane, and tending to return the vane to the side at which said connection is fastened, the location of said connection point with regard to the vertical axis of the vane causing the vane to rise when it turns to one side and compresses the spring and the gravitating tendency of the vane on its return to normal position acting to assist the spring in so returning it.

In testimony whereof I affix my signature in presence of two witnesses.

SAMUEL W. MARTIN.

Witnesses:
   OLIVER H. MILLER,
   H. M. PLAISTED.